United States Patent
Osgood

(10) Patent No.: US 6,198,524 B1
(45) Date of Patent: *Mar. 6, 2001

(54) POLARIZING SYSTEM FOR MOTION VISUAL DEPTH EFFECTS

(75) Inventor: Alan George Osgood, Redmond, WA (US)

(73) Assignee: Evergreen Innovations LLC, Carnation, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/294,123

(22) Filed: Apr. 19, 1999

(51) Int. Cl.[7] .................... G03B 21/32; G03B 21/00; G03B 27/22

(52) U.S. Cl. .................... 352/43; 352/86; 353/8; 359/478

(58) Field of Search .................. 352/43, 57, 60, 352/86; 353/8, 10; 359/464, 478; 348/58

(56) References Cited

U.S. PATENT DOCUMENTS

| | | | |
|---|---|---|---|
| 2,206,303 | * 7/1940 | Neumueller et al. | 351/232 |
| 3,445,153 | 5/1969 | Marks | 359/478 |
| 4,131,342 | 12/1978 | Dudley | 352/43 |
| 4,630,097 | 12/1986 | Marks | 348/58 |
| 4,705,371 | 11/1987 | Beard | 352/86 |
| 4,836,647 | 6/1989 | Beard | 359/464 |
| 4,893,898 | * 1/1990 | Beard | 359/464 |
| 4,957,361 | 9/1990 | Shaw | 352/59 |
| 5,751,397 | 5/1998 | Osgood | 352/86 |
| 5,886,771 | 3/1999 | Osgood | 352/43 |
| 5,993,004 | * 11/1999 | Moseley et al. | 353/8 |

* cited by examiner

Primary Examiner—Russell Adams
Assistant Examiner—Rodney Fuller

(57) ABSTRACT

A system for creating the perception of visual depth in scenery comprising lateral movements. A polarizing projection filter 21 controls the plane of polarization of projected light. The plane of polarization is changed by changing the orientation of the polarizing projection filter. An observer wears special viewing glasses 22 with polarizing filters when viewing scenery illuminated by the polarizing projection filter. The plane of polarization of the polarizing viewing filter for the right eye 23 is rotated 45 degrees clockwise from horizontal. The plane of polarization of the polarizing viewing filter for the left eye 24 is rotated 45 degrees counterclockwise from horizontal. When the polarizing projection filter is rotated clockwise from horizontal the scenery appears brighter to an observer's right eye than to the observer's left eye. Objects moving laterally 42 from right to left from the observer's perspective appear closer to the observer 43. Objects moving from left to right appear farther away from the observer. When the polarizing projection filter is rotated counterclockwise from horizontal the scenery appears brighter to an observer's left eye than to the observer's right eye. Objects moving from right to left from the observer's perspective appear farther away from the observer. Objects moving from left to right appear closer to the observer. In the first and second embodiment of the invention, the scenery comprises polarized imagery projected on a viewing screen. In the third embodiment, the scenery comprises live scenes illuminated by polarized light. The scenery can be viewed in full color. The dead eye effect can be avoided by periodically changing the plane of polarization of the polarizing projection filter.

3 Claims, 5 Drawing Sheets

POLARIZING SYSTEM FOR MOTION VISUAL DEPTH EFFECTS

CROSS-REFERENCE TO RELATED APPLICATION

This application is related to application Ser. No. 08/984,542. Filed Dec. 3, 1997, entitled "POLARIZING SYSTEM FOR MOTION VISUAL DEPTH EFFECTS", now U.S. Pat. No. 5,886,771, issued May Mar. 23, 1999.

BACKGROUND

1. The Field of the Invention

The present invention relates to methods and apparatus for using polarizing lenses or filters to create the perception of visual depth when viewing laterally moving objects in two dimensional single image displays and live scenes. In a further aspect, the present invention relates to the plane of polarization of polarizing filters used to produce the visual depth effects. In a still further aspect, the present invention relates to methods of controlling the movement of objects to create visual depth effects when observers wear glasses with polarizing lenses. The system is suited for motion picture films. The methods and apparatus may also be used for live scenes such as stage productions, video displays (television, computer displays, video games, etc.) and other types of media.

2. The Prior Art

The prior art includes methods to create the perception of depth in two-dimensional motion picture films and video displays. These methods have been described in or have been the subject of various patents. One class of prior art systems uses two separate shifted images to produce visual depth effects. These systems use special eye wear that transmits one image to the left eye and the other image to the right eye. When the special eye wear is worn by an observer, differences in the relative position of objects as seen by the two eyes produces the perception of depth. Observers viewing the imagery without the special glasses see double images.

The prior art commonly uses color or polarizing filters to separate the two images. When polarizing filters are used, light of the two images are polarized at right angles (90 degrees) to each other. Viewing glasses or spectacles with left and right eye polarizing filters with the plane of polarization at right angles to each other are used to transmit the image polarized in one plane to the left eye and the image polarized in the other plane to the right eye.

U.S. Pat. No. 4,957,361 to Shaw and U.S. Pat. No. 4,630,097 to Marks disclose systems using spectacles with left and right eye filters that are polarized at right angles to each other to produce the perception of depth when viewing motion pictures with double images that are polarized at right angles to each other. Numerous other prior art systems use viewing glasses with lenses polarized at right angles to each other in a similar manner to transmit one image to the left eye and another image to the right eye.

Another method of creating visual depth effects is based on the Pulfrich Effect. This effect is produced by viewing moving objects which appear brighter to one eye than the other. The standard Pulfrich Effect is commonly produced by placing a dark lens or filter over one eye. Objects that move laterally in one direction appear to be farther away from the observer. Conversely, objects that move laterally in the opposite direction appear to be closer to the observer. The standard Pulfrich Effect is a unidirectional motion sensitive depth effect. The relationship between the direction of movement and the perception of depth is dependent upon which eye is covered by the dark lens. When the left eye is covered by the dark lens, objects moving left to right (from the observer's perspective) appear to be farther away. Objects moving right to left appear to be closer. When the right eye is covered by the dark lens, objects moving left to right appear to be closer. Objects moving right to left appear to be farther away.

The apparatus used to produce the standard Pulfrich Effect tends to cause an undesirable side effect. The eye covered by the dark lens receives substantially less light than the other eye. This produces the sensation that the eye receiving less light is not working or dead. This dead eye effect becomes irritating to observers over time.

U.S. Pat. No. 3,445,153 to Marks is based on the standard Pulfrich Effect. Dudley discloses in U.S. Pat. No. 4,131,342 a method of combining the standard Pulfrich Effect with a chromostereoscopic effect. The chromostereoscopic effect is based on the finding that objects of colors towards the red end of the visual spectrum appear closer than objects of colors towards the blue end of the spectrum. The chromostereoscopic effect is very weak. It also restricts the use of colors in imagery. U.S. Pat. No. 4,131,342 teaches that the standard Pulfrich Effect is due to a "differential visual time-lag" whereby the human visual system processes a brighter image faster than a dimmer image. Therefore the location of moving objects appears to be different for the eye receiving the brighter image than for the eye receiving the dimmer image. The location of moving objects appears to be more advanced for the eye receiving the brighter image than for the eye receiving the dimmer image. This apparent eye to eye difference in the perceived location of moving objects produces the visual depth effect. U.S. Pat. No. 4,705,371 to Beard is also based on the standard Pulfrich Effect. Observers wear special lenses to reduce the dead eye effect. U.S. Pat. No. 4,836,647 to Beard discloses alternative colored filters to reduce the dead eye effect. The four methods above (U.S. Pat. Nos. 3,445,153; 4,131,342; 4,705,371; and 4,836,647) are all limited by the unidirectional nature of the standard Pulfrich Effect. They are all also somewhat prone to the dead eye effect.

U.S. Pat. No. 5,751,397 by Osgood teaches means of using colors to produce a bi-directional Pulfrich like effect. U.S. Pat. No. 5,751,397 uses objects moving laterally against colored backgrounds or surrounds, laterally moving colored objects, and colored viewing glasses. The left lens of the viewing glasses passes from 4 to 20 times as much light of one color (e.g. red) as the right lens. The right lens of the viewing glasses passes from 4 to 20 times as much light of another color (e.g. green). Objects moving laterally against surrounds of the first color, and laterally moving objects of the first color, appear closer to the observer when they move from left to right and farther away from the observer when they move from right to left. Objects moving laterally against surrounds of the second color, and laterally moving objects of the second color, appear closer to the observer when they move from right to left and farther away from the observer when they move from left to right.

The methods of U.S. Pat. No. 5,751,397 allow each eye to receive enough light to reduce or even totally avoid the dead eye effect. However, neither eye receives the full intensity of light across the entire visual spectrum. Therefore observers may perceive a reduction in the color saturation of the images viewed. The directionality of the depth effects is dependent upon the color of laterally moving objects and their surrounds. This limits the choice of colors in the imagery. It may also lead observers to use the colors of the laterally moving objects and their surrounds to predict the direction of the visual depth effects.

U.S. Pat. No. 5,886,771 by Osgood teaches means of using polarizing filters to produce a bi-directional Pulfrich like effect. A polarizing projection filter provides means to control the plane of polarization of projected imagery. The plane of polarization is changed by changing the orientation of the polarizing projection filter. An observer wears special viewing glasses with polarizing filters when viewing imagery polarized by the polarizing projection filter. The plane of polarization of the polarizing viewing filter for the right eye is rotated 30 degrees clockwise from horizontal. The plane of polarization of the polarizing viewing filter for the left eye is rotated 30 degrees counterclockwise from horizontal.

The imagery is projected onto a viewing screen which preserves the plane of polarization of the imagery light. When the polarizing projection filter has an angular offset of approximately 45 degrees clockwise from horizontal the projected imagery appears approximately 20 times brighter to an observer's right eye than to the observer's left eye. Objects moving laterally from right to left from the observer's perspective appear closer to the observer. Objects moving from left to right appear farther away from the observer. When the polarizing projection filter has an angular offset of approximately 45 degrees counterclockwise from horizontal the projected imagery appears approximately 20 times brighter to an observer's left eye than to the observer's right eye. Objects moving from right to left from the observer's perspective appear farther away from the observer. Objects moving from left to right appear closer to the observer.

The imagery for U.S. Pat. No. 5,751,397 can be viewed in full color. The dead eye effect can be avoided by periodically changing the plane of polarization of the polarizing projection filter. When the viewing screen used for U.S. Pat. No. 5,751,397 partially depolarizes the imagery light, the eye-to-eye brightness ratio is less than 20-to-1. This can reduce the strength of the perceived depth effects. The projection screens of certain movie theaters cause partial depolarization of the light of the projected imagery. This can reduce the strength of the perceived depth effects for U.S. Pat. No. 5,751,397 when these projection screens are used.

BRIEF SUMMARY AND OBJECTS OF THE INVENTION

The present invention relates to methods and apparatus for using polarizing lenses to make scenes containing laterally moving objects appear brighter to either the left eye or the right eye to produce bi-directional visual depth effects.

A first object of the invention is to teach methods of producing visual depth effects by using (a) polarizing projection filters that control the plane of polarization of projected imagery, (b) polarizing viewing glasses with at least 75 degrees of angular offset between the plane of polarization of the filters for the left and right eyes, (c) screens which maintain the polarization of the imagery light, and (d) imagery which contains lateral movement.

A second object of the invention is to provide a system of (a) polarizing projection filters that control the plane of polarization of projected imagery, (b) polarizing viewing glasses with at least 75 degrees of angular offset between the plane of polarization of the filters for the left and right eyes, and (c) screens which maintain the polarization of the imagery light, to produce visual depth effects when polarized imagery which contains lateral movement is observed.

A third object of the invention is to teach methods of producing visual depth effects by using (a) polarizing projection filters that control the plane of polarization of projected imagery, (b) polarizing viewing glasses, (c) screens which partially depolarize the imagery light, and (d) imagery which contains lateral movement.

A fourth object of the invention is to provide a system of (a) polarizing projection filters, (b) polarizing viewing filters, and (c) screens which partially depolarize the imagery light, to produce visual depth effects when polarized imagery which contains lateral movement is observed.

A fifth object of the invention is to provide methods for using laterally moving objects and laterally moving backgrounds in live scenes to create the perception of depth when the scenes are illuminated with polarized light and observed with viewer glasses having polarizing lens or filters.

A sixth object of the invention is to provide a system of polarizing light projection filters and polarizing viewing filters to produce visual depth effects when a live scene containing laterally moving objects is observed.

A seventh object of the invention is to provide a process of operating a data processor with a visual display to generate polarized imagery with laterally moving objects and laterally moving backgrounds on the visual display to create visual depth effects.

An eighth object of the invention is to provide motion sensitive depth effects using live scenes or projected imagery without producing a dead eye effect wherein observers have the sensation that one eye is not functioning properly.

A ninth object of the invention is to provide motion sensitive depth effects using live scenes, or projected imagery without reducing the perceived color saturation of the imagery.

The invention is suited for motion pictures. The invention is also suited for video and computer displays as well as live scenes.

BRIEF DESCRIPTION OF THE FIGURES

FIG. 4 shows that the polarizing viewing glasses do not produce visual depth effects when an observer views a scene illuminated by light projected through a polarizing projection filter with the plane of polarization oriented horizontally.

FIG. 5 shows the visual depth effect for an observer viewing a scene illuminated by light projected through a polarizing projection filter with the plane of polarization rotated clockwise from horizontal. The object in the scene is moving from right to left from the observer's perspective.

FIG. 6 shows the visual depth effect for an observer viewing a scene illuminated by light projected through a polarizing projection filter with the plane of polarization rotated clockwise from horizontal. The object in the scene is moving from left to right.

FIG. 7 shows the visual depth effect for an observer viewing a scene illuminated by light projected through a polarizing projection filter with the plane of polarization rotated counterclockwise from horizontal. The object in the scene is moving from left to right.

FIG. 8 shows the visual depth effect for an observer viewing a scene illuminated by light projected through a polarizing projection filter with the plane of polarization rotated counterclockwise from horizontal. The object in the scene is moving from right to left.

REFERENCE NUMERALS IN FIGURES

Figure 1:
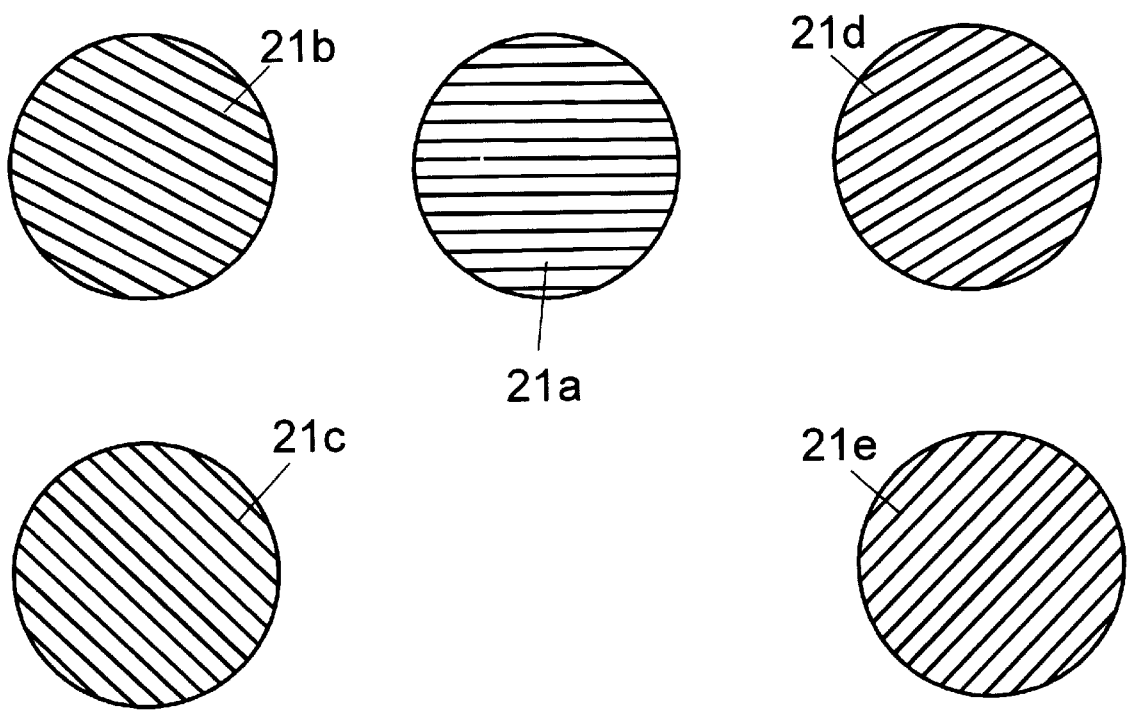
FIG. 1 shows a polarizing projection filter with its plane of polarization in five different angular orientations.

21—Polarizing projection filter
21a—Polarizing projection filter with the plane of polarization oriented horizontally
21b—Polarizing projection filter with the plane of polarization rotated 30 degrees clockwise from horizontal
21c—Polarizing projection filter with the plane of polarization rotated 45 degrees clockwise from horizontal
21d—Polarizing projection filter with the plane of polarization rotated 30 degrees counterclockwise from horizontal
21e—Polarizing projection filter with the plane of polarization rotated 45 degrees counterclockwise from horizontal
22—Polarizing viewing glasses
23—Polarizing viewing filter for the right eye with the plane of polarization rotated 45 degrees clockwise from horizontal
24—Polarizing viewing filter for the left eye with the plane of polarization rotated 45 degrees counterclockwise from horizontal
25—Neutral density filter
31—Light transmission with no depolarization between projection filter and viewing filters
32—Light transmission with partial depolarization between projection filter and viewing filters
41—Projector
42—Current position of laterally moving object
42'—Earlier position of laterally moving object
43—Perceived position of object 42 in front of actual location
44—Perceived position of object 42 behind actual location
51—Movable frame for polarizing projection filters
52—Movie film
53—Polarizing projection filter embedded in movie film

DETAILED DESCRIPTION OF THE PREFERRED EMBODIMENTS

Summary of Invention

The present invention uses polarizing filters to produce visual depth effects in scenes containing lateral movement. The invention uses viewing glasses with filters of fixed planes of polarization. The plane of polarization of the polarizing filter for the right eye is rotated approximately 45 degrees clockwise from horizontal. The plane of polarization of the polarizing filter for the left eye is rotated approximately 45 degrees counterclockwise from horizontal. The scene is illuminated with light projected through a polarizing projection filter. When the polarizing plane of the polarizing projection filter is horizontal, the imagery appears equally bright to both eyes of an observer viewing the scene through the viewing glasses. No visual depth effects are produced.

When the plane of polarization of the polarizing projection filter is offset clockwise from horizontal, its plane of polarization is aligned more with the plane of polarization of the polarizing viewing filter for the right eye than for the polarizing viewing filter for the left eye. Now scenes observed through the polarizing viewing glasses appears brighter to the right eye than to the left eye. This provides means whereby objects moving from right to left from the observers perspective appear closer to the observer than their actual location. Objects moving left to right appear to be farther away from the observer than their actual location. The term object is used herein to refer to foreground objects as well as backgrounds. The depth effects described here apply to both laterally moving foreground objects and laterally moving backgrounds.

When the plane of polarization of the polarizing projection filter is offset counterclockwise from horizontal, its plane of polarization is aligned more with the plane of polarization of the polarizing viewing filter for the left eye than for the polarizing viewing filter for the right eye. Now scenes appears brighter to the left eye than to the right eye. This provides means whereby objects moving left to right appear closer to the observer than their actual location. Objects moving right to left appear to be farther away from the observer than their actual location.

The plane of polarization of the polarizing projection filter can be offset clockwise from horizontal approximately the same amount of time it is offset counterclockwise from horizontal. This balances the apparent brightness of the scenes to the left and right eyes over time. The dead eye effect can thereby be avoided. The polarizing projection filter and polarizing viewing filters allow for the full color of scenes to be perceived by observers.

The first and second embodiments of the present invention uses polarizing filters to produce visual depth effects in two dimensional single image displays containing lateral movement. The third embodiment of the present invention uses polarizing filters to produce visual depth effects in live scenes containing lateral movement.

Detailed Description of the Invention

Reference is now made to the drawings wherein like parts are designated with like numerals throughout.

Polarizing Projection Filter

The present invention uses polarizing projection filters in a plurality of orientations to control the plane of polarization of projected light. A polarizing projection filter is positioned between the projector and the observer. The light is projected through the polarizing projection filter. The projected light is thereby polarized in the plane of the polarizing projection filter. FIG. 1 illustrates a polarizing projection filter in five different orientations. The polarizing projection filter is shown orientated horizontally by 21a. When the polarizing projection filter is oriented with its plane of polarization horizontal, the projected light is polarized horizontally. When the polarizing projection filter is rotated with its plane of polarization 30 degrees clockwise from horizontal as shown by 21b the projected light is polarized in a plane 30 degrees clockwise from horizontal. When the polarizing projection filter is rotated with its plane of polarization 45 degrees clockwise from horizontal as shown by 21c the projected light is polarized in a plane 45 degrees clockwise from horizontal. When the polarizing projection filter is rotated with its plane of polarization 30 degrees counterclockwise from horizontal as shown by 21d the projected light is polarized in a plane 30 degrees counterclockwise from horizontal. When the polarizing projection filter is rotated with its plane of polarization 45 degrees counterclockwise from horizontal as shown by 21e, the projected light is polarized in a plane 45 degrees counterclockwise from horizontal.

Viewing Glasses With Polarizing Filters

Figure 2:
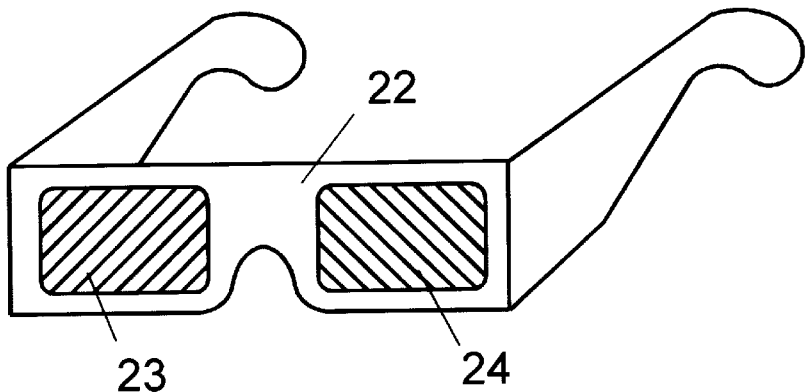
FIG. 2 is an illustration of polarizing viewing glasses with the plane of polarization of the polarizing viewing filter for the right eye rotated 45 degrees clockwise from horizontal and the plane of polarization of the polarizing viewing filter for the left eye rotated 45 degrees counterclockwise from horizontal.

FIG. 2 illustrates the preferred viewing glasses 22 of the invention. The lenses of the viewing glasses are polarizing filters. The plane of polarization is fixed for both the polarizing viewing filter for the right eye 23 and the polarizing viewing filter for the left eye 24. The same planes of polarization for the polarizing viewing filters are used for the first, second and third embodiments of the invention. The plane of polarization for the polarizing viewing filter for the right eye 23 is rotated approximately 45 degrees clockwise from horizontal. The plane of polarization for the polarizing viewing filter for the left eye 24 is rotated approximately 45 degrees counterclockwise from horizontal. The difference in the orientations of the planes of polarization of the two polarizing viewing filters for the preferred viewing glasses is approximately 90 degrees. Other fixed planes of polarization could be used for the polarizing viewing glasses. The observer wears the polarizing viewing glasses while observing scenes illuminated by light projected through the polarizing projection filter.

Light Transmission by Polarizing Filters

A polarizing projection filter is used in combination with the polarizing viewing filters for left and right eyes to control the relative eye-to-eye brightness of scenes. A polarizing filter with its plane of polarization in a horizontal plane transmits essentially all of the light which vibrates in a horizontal orientation and blocks essentially all of the light which vibrates in a vertical orientation. The amount of light transmitted by a first polarizing filter which is then transmitted by a second polarizing filter is determined by the angular offset between the first and second polarizing filters.

Figure 3:
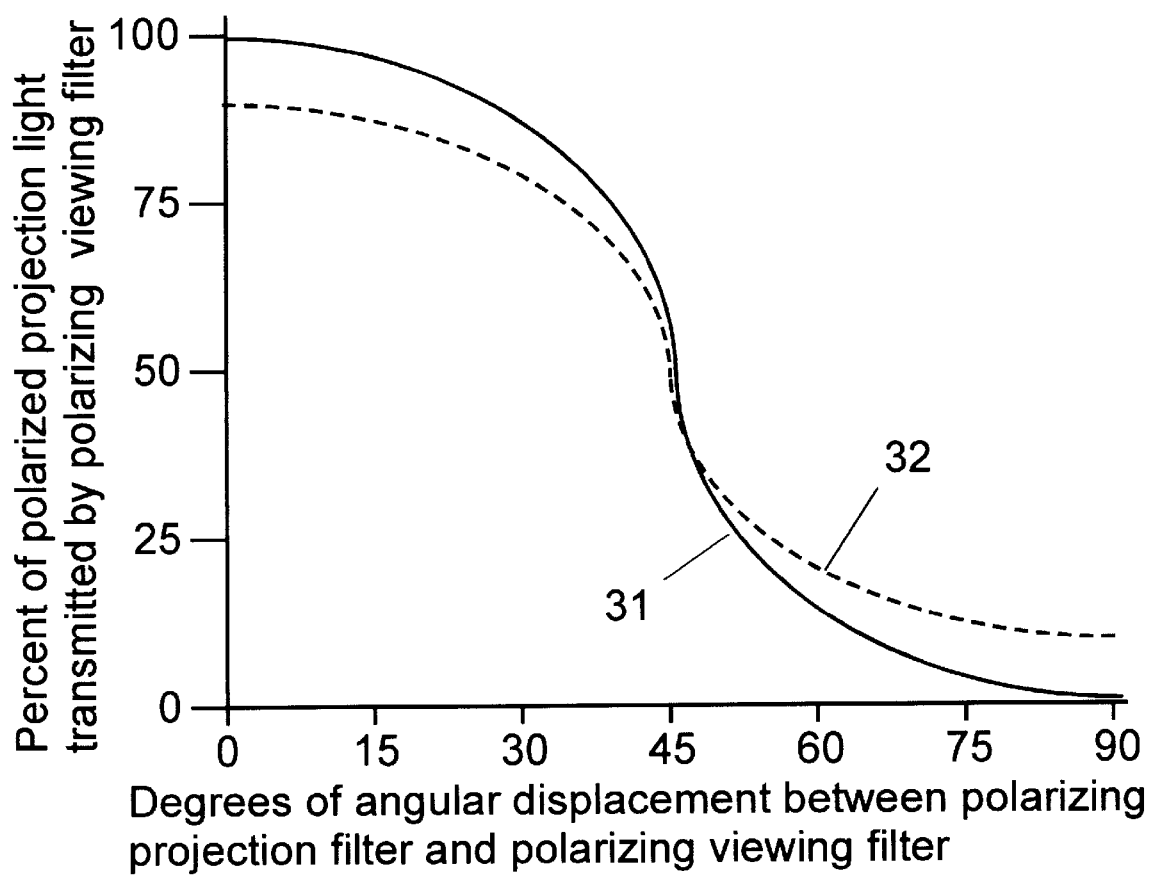
FIG. 3 illustrates the amount of light transmitted for angular offsets of from zero degrees to 90 degrees between the plane of polarization of a polarizing projection filter and the plane of polarization of a polarizing viewing filter.

FIG. 3 shows how changing the angular offset of the plane of polarization of a polarizing projector filter relative to the polarizing plane of a polarizing viewing filter changes the amount of transmitted light. The curve of light transmission 31 shows the reduction in the percentage of light transmitted as the angular offset between the plane of polarization of a polarizing projection filter and a polarizing viewing filter increases from zero degrees to 90 degrees. The shape of curve 31 is approximately sinusoidal. When the two polarizing filters are aligned (zero degrees of angular offset) nearly 100% of the light transmitted by the polarizing projector filter is transmitted through the polarizing viewing filter. When the angular offset between the two polarizing filters is 15 degrees, approximately 95% of the light transmitted by the polarizing projector filter is transmitted through the polarizing viewing filter. As the angular offset between the two polarizing filters increases to 30 degrees, the amount of light that is transmitted through the polarizing viewing filter is gradually reduced to approximately 88%. Increasing the angular offset from 30 degrees to 60 degrees results in a rapid reduction in the light transmitted from approximately 88% to approximately 12%. Increasing the angular offset from 60 degrees to 75 degrees reduces the light transmission to approximately 5%. Continuing to increase from 75 degrees to 90 degrees gradually reduces the light transmission from approximately 5% to essentially zero. Light transmission curve 31 is applicable when light passes directly from a polarizing projection filter through a polarizing viewing filter. Light transmission curve 31 is also applicable when light (a) passes through a polarizing projection filter, (b) is then reflected off a screen or surface which preserves the polarization of the light and (c) then passes through the polarizing viewing filter.

FIG. 3 also shows a curve of light transmission 32 when some of the light is depolarized after it passes through a polarizing projection filter and before it passes through a polarizing viewing filter. This is sometimes referred to as partial depolarization. Partial depolarization occurs when the projected polarized light is reflected off a screen or surface which changes the polarization of some of the light. Partial depolarization can occur when the projected light is reflected off certain types of movie theater screens. Likewise partial depolarization can occur when the projected light is transmitted through certain types of rear projection screens. Partial depolarization can also occur when objects in live scenes depolarize light that is reflected off them. Light transmission curve 32 shows a condition where the amount of light transmitted through the viewing polarizing filter ranges from approximately 10% to 90% of the light transmitted through the polarizing projection filter. The present invention utilizes polarizing filter orientations that take advantage of the light transmission curves 31 and 32 shown in FIG. 3.

First Embodiment—Viewing Screen Preserves Imagery Polarization

Figure 4:
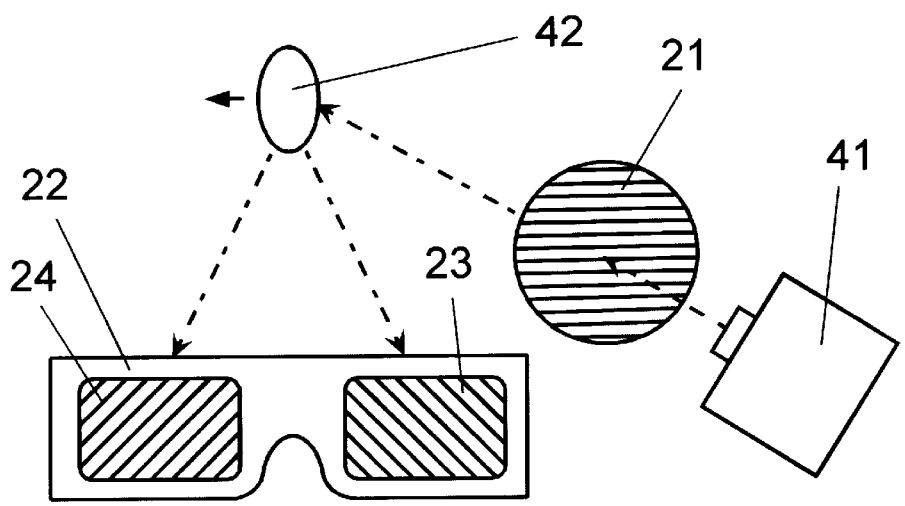
FIGS. 4 through 8 show visual depth effects manifested to an observer wearing the polarizing viewing glasses while observing scenes containing laterally moving objects illuminated by light projected through a polarizing projection filter with the plane of polarization at different angular orientations.

In a first embodiment of the present invention the scene is produced by projected imagery. The imagery is projected through the projection filter onto a viewing screen that preserves the polarization of the projected imagery. FIG. 4 shows a projector 41; a polarizing projection filter 21 with the plane of polarization oriented horizontally; viewing glasses 22 with a polarizing viewing filter for the right eye 23 with the plane of polarization rotated 45 degrees clockwise from horizontal, and a polarizing viewing filter for the left eye 24 with the plane of polarization rotated 45 degrees counterclockwise from horizontal; and a laterally moving object 42. The light projector 41 may be a movie or video projector that projects imagery onto a screen. The polarizing viewing glasses 22 and the laterally moving object 42 are shown from the observer's perspective. Light from the projector 41 is projected through the polarizing projection filter 21 with the plane of polarization oriented horizontally to a viewing screen. An image of the laterally moving object 42 is reflected by the viewing screen towards polarizing viewing glasses 22 worn by an observer. The image of the laterally moving object 42 is transmitted through the polarizing viewing filter for the right eye 23 to the observer's right eye and through the polarizing viewing filter for the left eye 24 to the observer's left eye. The actual location of the imagery is the surface of the viewing screen.

The offset angle between the polarizing projection filter 21 and polarizing viewing filter for the right eye 23 is approximately 45 degrees. Likewise, the offset angle between the polarizing projection filter 21 and polarizing viewing filter for the left eye 24 is approximately 45 degrees. The plane of polarization of the projection polarizing filter is neutral relative to the plane of polarization of the polarizing viewing filter for the right eye and the plane of polarization of the polarizing viewing filter for the left eye. Approximately the same amount of light is transmitted to an observer's right eye as to an observer's left eye. The horizontally moving object 42 appears approximately equally bright to both the right eye and the left eye of the observer. In the condition shown in FIG. 4 the polarizing projection filter and the polarizing viewing filters do not produce a visual depth effect. Since the imagery appears approximately equally bright to both the left and right eyes, this condition does not contribute to the dead eye effect. The conditions shown in FIG. 4 apply whether the viewing screen completely preserves the polarization of the projected imagery, partially depolarizes the projected imagery, or even completely depolarizes the projected imagery. In each case the imagery appears approximately equally bright to both the left and right eyes. The polarizing viewing filters do not produce a visual depth effect or contribute to the dead eye effect.

Figure 5:
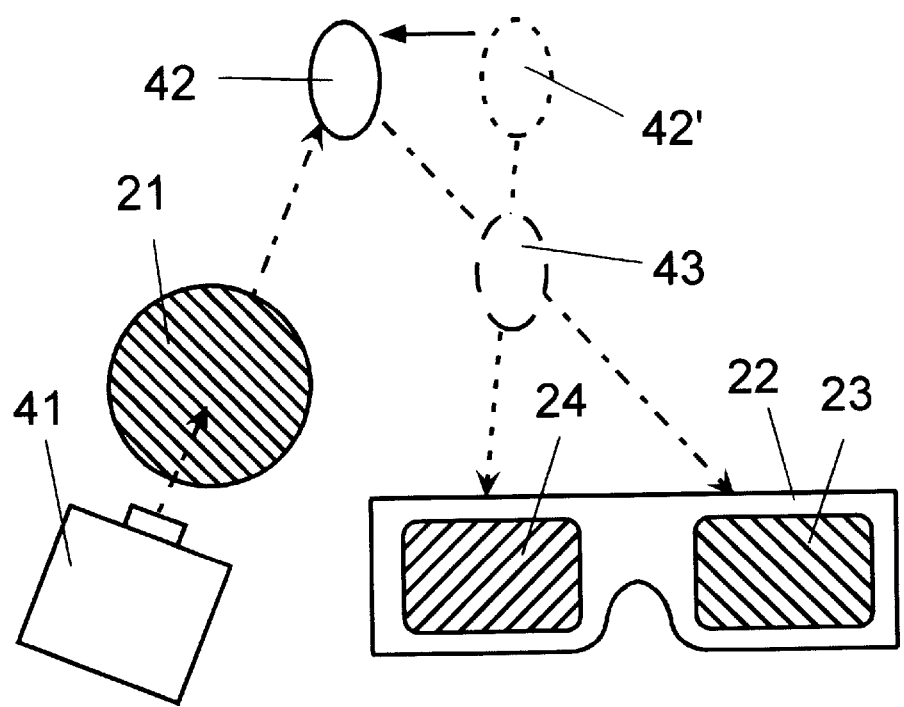

FIG. 5 shows a visual depth effect produced by the first embodiment when the polarizing plane of the projection filter 21 is rotated approximately 30 degrees clockwise from horizontal. The light from the projector 41 which is transmitted by the polarizing projection filter 21 is polarized in a plane rotated 30 degrees clockwise from horizontal. The viewing screen of the first embodiment maintains the polarization of the reflected light and all of the reflected light is in the plane rotated 30 degrees clockwise from horizontal. The polarizing viewing filter for the right eye 23 for the first embodiment is rotated 45 degrees clockwise from horizontal. The plane of polarization of the polarizing viewing filter for the right eye has an angular offset of approximately 15 degrees from the plane of polarization of the reflected light. Light transmission curve 31 of FIG. 3 shows how much of the reflected light is transmitted by the polarizing viewing filter for the right eye. Approximately 95% of the reflected light is transmitted by the polarizing viewing filter for the right eye. The plane of polarization of the polarizing viewing filter for the left eye 24 for the first embodiment is rotated 45 degrees counterclockwise from horizontal. The plane of polarization of the polarizing viewing filter for the left eye is offset approximately 75 degrees from the orientation of the reflected light. Approximately 5% of the reflected light is transmitted by the polarizing viewing filter for the left eye.

The projected imagery appears approximately 20 times brighter to the right eye than to the left eye. The laterally moving object 42 moves from right to left from the observer's perspective. The right eye sees the laterally moving object in its present position 42 on the surface of the viewing screen. The left eye sees the object in a position 42' where it was a short period of time earlier. Position 42' is to the right of position 42. The observer's visual system combines the image seen by the right eye 42 with the image seen at the same time by the left eye 42' to produce a perceived image 43. The perceived location 43 of the laterally moving object 42 is in front of the viewing screen. This produces a visual depth effect.

Figure 6:
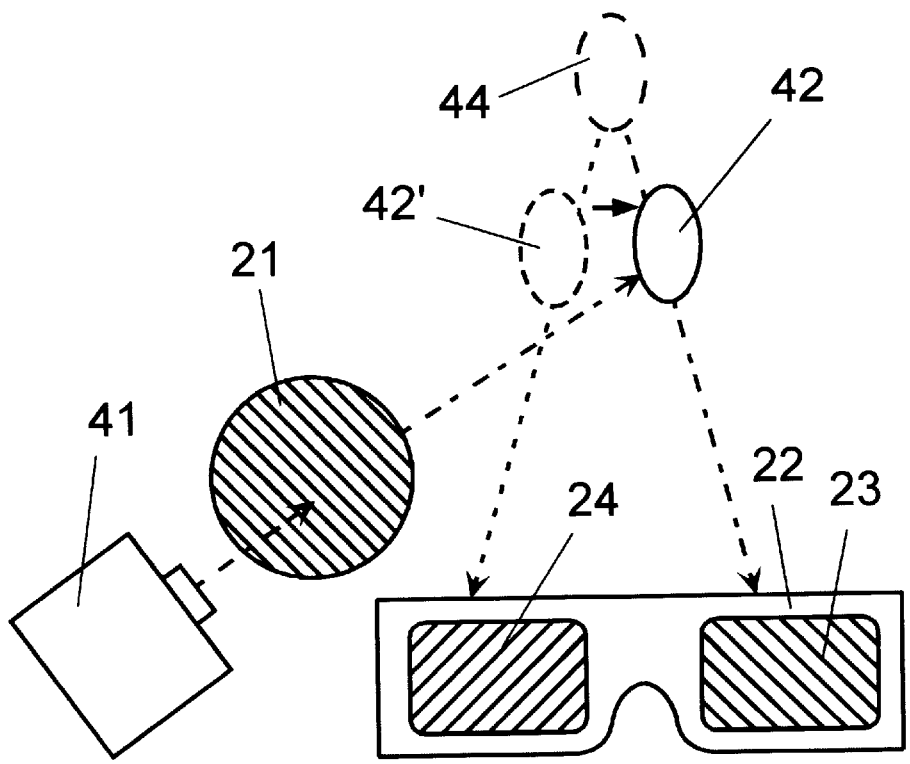

FIG. 6 shows the visual depth effect produced by the first embodiment when the laterally moving object 42 moves from left to right. As in FIG. 5, the plane of polarization of the polarizing projection filter 21 is rotated 30 degrees clockwise from horizontal. Now the position 42' where the left eye sees the laterally moving object is to the left of the position 42 where the right eye sees the object. The laterally moving object is perceived to be at a location 44 behind the viewing screen. This produces a visual depth effect which is opposite to the effect produced in FIG. 5.

Figure 7:
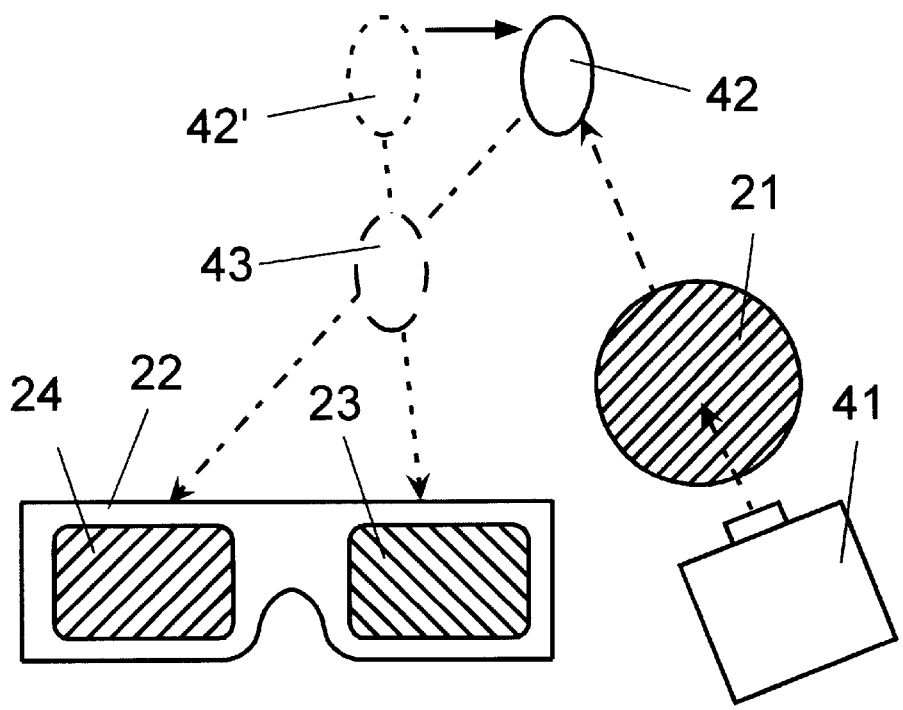

FIG. 7 shows the visual depth effect produced by the first embodiment when the polarizing plane of the polarizing projection filter 21 is rotated approximately 30 degrees counterclockwise from horizontal. The light from the projector 41 which is transmitted by the polarizing projection filter 21 is polarized in a plane rotated 30 degrees counterclockwise from horizontal. The viewing screen of the first embodiment maintains the polarization of the reflected light and all of the reflected light is in the plane rotated 30 degrees counterclockwise from horizontal. The polarizing viewing filter for the right eye 23 is rotated 45 degrees clockwise from horizontal. The plane of polarization of the polarizing viewing filter for the right eye is offset approximately 75 degrees from the plane of polarization of the reflected light. Light transmission curve 31 of FIG. 3 shows how much of the reflected light is transmitted by the polarizing viewing filter for the right eye. Approximately 5% of the reflected light is transmitted by the polarizing viewing filter for the right eye. The polarizing viewing filter for the left eye 24 is rotated 45 degrees counterclockwise from horizontal. The plane of polarization of the viewing filter for the left eye is offset approximately 15 degrees from the plane of polarization of the reflected light. Approximately 95% of the reflected light is transmitted by the polarizing viewing filter for the left eye.

The projected imagery appears approximately 20 times brighter to the left eye than to the right eye. The laterally moving object 42 moves from left to right from the observer's perspective. The left eye sees the laterally moving object in its present position 42 on the surface of the viewing screen. The right eye sees the object in a position 42' where it was a short period of time earlier. Position 42' is to the right of position 42. The laterally moving object is perceived to be at a location 44 behind the viewing screen. This produces a visual depth effect.

The visual depth effect produced in FIG. 7 is the same as the depth effect produced in FIG. 5. Whereas in FIG. 5 an object moving laterally from right to left is perceived to be in front of the screen, in FIG. 7 an object moving laterally from left to right is perceived to be in front of the screen.

Figure 8:
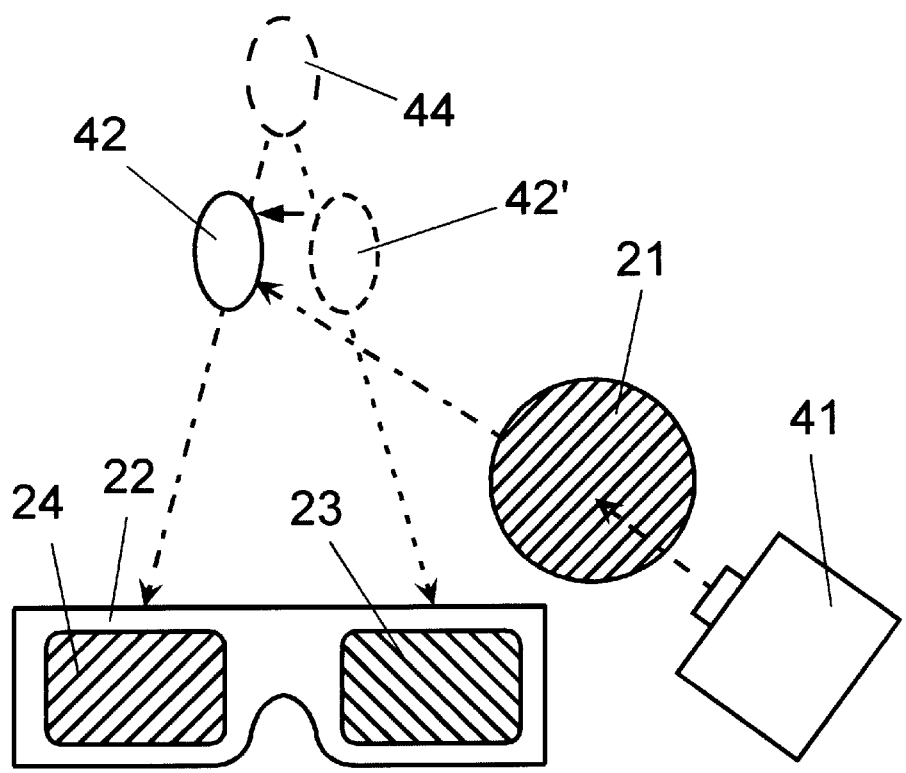

FIG. 8 shows the visual depth produced by the first embodiment when the laterally moving object 42 moves from right to left. As in FIG. 7, the plane of polarization of the polarizing projection filter 21 is rotated 30 degrees counterclockwise from horizontal. Now the position 42' where the right eye sees the laterally moving object is to the left of the position 42 where the left eye sees the object. The laterally moving object is perceived to be at a location 43 in front of the viewing screen. This produces a visual depth effect which is the same as the effect produced in FIG. 6 and opposite to the effect produced in FIGS. 5 and 7.

FIGS. 5 and 8 show how objects moving laterally from right to left can be made to appear either in front of or behind the viewing screen of the first embodiment. FIGS. 6 and 7 show how objects moving laterally from left to right can be made to appear either in front of or behind the viewing screen of the first embodiment.

Second Embodiment—Viewing Screen Partially Depolarizes Imagery

The second embodiment of the invention is similar to the first embodiment. The viewing screen of the second embodiment partially depolarizes the light of the projected imagery in a random manner. The angle of rotation of the projection polarizing filter is increased for the second embodiment to compensate for the depolarization of the projected light by the projection screen. FIG. 5 shows a visual depth effect for the second embodiment produced when the polarizing plane of the projection filter 21 is rotated approximately 45 degrees clockwise from horizontal. The light from the projector 41 which is transmitted by the polarizing projection filter 21 is polarized in a plane rotated 45 degrees clockwise from horizontal. If the viewing screen depolarizes approximately 10% of the reflected light, approximately 95% of the reflected light is transmitted by the polarizing viewing filter for the right eye. Approximately 5% of the reflected light is transmitted by the polarizing viewing filter for the left eye. When the projection filter is rotated 45 degrees from horizontal, the projected imagery appears approximately 20 times brighter to one eye than to the other eye with projection screens that depolarize approximately 10% of the projected light. In this case the visual depth effects for the second embodiment are similar to the depth effects for the first embodiment.

FIG. 5 shows a visual depth effect produced by the second embodiment by the viewing glasses when the polarizing plane of the projection filter 21 is rotated approximately 45 degrees clockwise from horizontal. The projected imagery appears approximately 20 times brighter to the right eye than to the left eye. The laterally moving object moves from right to left from the observer's perspective. The right eye sees the laterally moving object in its present position 42 on the surface of the viewing screen. The left eye sees the object in a position 42' where it was a short period of time earlier. Position 42' is to the right of position 42. The observer's visual system combines the image seen by the right eye 42 with the image seen at the same time by the left eye 42' to produce a perceived image 43. The perceived location 43 of the laterally moving object 42 is in front of the viewing screen. This produces a visual depth effect.

FIG. 6 shows the visual depth effect produced by the second embodiment when the laterally moving object 42 moves from left to right. As in FIG. 5, the plane of polarization of the polarizing projection filter 21 is rotated 45 degrees clockwise from horizontal. Now the position 42' where the left eye sees the laterally moving object is to the left of the position 42 where the right eye sees the object. The laterally moving object is perceived to be at a location 44 behind the viewing screen. This produces a visual depth effect which is opposite to the effect produced in FIG. 5.

FIG. 7 shows the visual depth effect produced by the second embodiment when the polarizing plane of the polarizing projection filter 21 is rotated approximately 45 degrees counterclockwise from horizontal. Now the plane of polarization of the polarizing viewing filter for the left eye is approximately aligned with the plane of polarization of 95% of the reflected light. This light is transmitted by the polarizing viewing filter for the left eye. Approximately 95% of the reflected light is transmitted by the polarizing viewing filter for the left eye. The projected imagery appears brighter to the left eye than to the right eye. The laterally moving object moves from left to right from the observer's perspective. The left eye sees the laterally moving object in its present position 42 on the surface of the viewing screen The right eye sees the object in a position 42' where it was a short period of time earlier. Position 42' is to the right of position 42. The laterally moving object is perceived to be at a location 44 behind the viewing screen. This produces a visual depth effect.

The visual depth effect produced in FIG. 7 is the same as the depth effect produced in FIG. 5. Whereas in FIG. 5 an object moving laterally from right to left is perceived to be in front of the screen, in FIG. 7 an object moving laterally from left to right is perceived to be in front of the screen.

FIG. 8 shows the visual depth produced by the second embodiment when the laterally moving object 42 moves from right to left. As in FIG. 7, the plane of polarization of the polarizing projection filter 21 is rotated 45 degrees counterclockwise from horizontal. Now the position 42' where the right eye sees the laterally moving object is to the left of the position 42 where the left eye sees the object. The laterally moving object is perceived to be at a location 43 in front of the viewing screen. This produces a visual depth effect which is the same as the effect produced in FIG. 6 and opposite to the effect produced in FIGS. 5 and 7.

FIGS. 5 and 8 show how objects moving laterally from right to left can be made to appear either in front of or behind the viewing screen for the second embodiment. FIGS. 6 and 7 show how objects moving laterally from left to right can be made to appear either in front of or behind the viewing screen for the second embodiment.

The projected imagery appears approximately 20 times brighter to one eye than to the other eye with projection screens that maintain the polarization of the projected light when the projection filter is rotated 30 degrees from horizontal. Likewise, the projected imagery appears approximately 20 times brighter to one eye than to the other eye with projection screens that depolarize approximately 10% of the projected light when the projection filter is rotated 45 degrees from horizontal. When the projection screen depolarizes substantially more than 10% of the light, the eye-to-eye brightness ratio will be less than 20-to-1 for all orientations of the projection filter. This may decrease the strength of the perceived depth effects.

Third Embodiment—Live Scenes

The prior art only taught how to produce motion based depth effects with projected imagery. Polarizing filters can also be used to produce depth effects with live scenes. In the third embodiment of the present invention laterally moving objects in live scenes can be made to appear either in front of or behind their actual locations by the use of polarizing light projection filters and polarizing viewing filters.

The live scenes of the third embodiment are similar to the viewing screens of the first and second embodiments. One or more light projectors 41 project light through polarizing projection filters onto the live scene. The plane of polarization of all of the projection filters are rotated the same amount from horizontal. Objects and scenery used in the live scenes reflect the polarized light to the observers viewing glasses. Some objects and scenery used in live scenes maintain the plane of polarization of light that they reflect. Other objects and scenery tend to randomly depolarize the light that they reflect. Still other objects and scenery tend to change the plane of polarization of the light that they reflect. The amount of depolarization or change in plane of polarization can be affected by the angle at which the light is reflected from the surface of objects and scenery. The plane of polarization of light tends to be affected more when the light is reflected at a small angle from the surface than when the light is reflected straight back. Light projected from behind the observer tends to be reflected back to the observer in the same orientation. Light projected from the side, above or below is more likely to be reflected towards the viewer with a different plane of polarization.

The polarizing filters of the projectors are rotated approximately 30 degrees from horizontal to produce the visual depth effects for laterally moving objects in live scenery of the third embodiment that maintains the plane of polarization of the projected light. The polarizing filters of the projectors are rotated between 30 and 45 degrees from horizontal to produce the visual depth effects for laterally moving objects in live scenery of the third embodiment that depolarizes some of the projected light.

FIG. 5 shows a visual depth effect for the third embodiment produced when the polarizing plane of the projection filter 21 is rotated clockwise from horizontal. The live scene appears brighter to the right eye than to the left eye. The visual depth effects for the third embodiment are similar to the depth effects for the second embodiment. The laterally moving object 42 moves from right to left from the observer's perspective. The right eye sees the laterally moving object in its present position 42. The left eye sees the object in a position 42' where it was a short period of time earlier. Position 42' is to the right of position 42. The observer's visual system combines the object as seen by the right eye 42 with the object as seen at the same time by the left eye 42' to produce a perceived object location 43. The perceived location 43 of the laterally moving object 42 is in front of its actual location. This produces a visual depth effect.

FIG. 6 shows the visual depth effect for the third embodiment produced when the laterally moving object 42 moves from left to right. As in FIG. 5, the plane of polarization of the polarizing projection filter 21 is rotated clockwise from horizontal. Now the position 42' where the left eye sees the laterally moving object is to the left of the position 42 where the right eye sees the object. The laterally moving object is perceived to be at a location 44 behind its actual location. This produces a visual depth effect which is opposite to the effect produced in FIG. 5.

FIG. 7 shows the visual depth effect for the third embodiment produced when the polarizing plane of the polarizing projection filter 21 is rotated counterclockwise from horizontal. The live scene appears brighter to the left eye than to the right eye. The laterally moving object 42 moves from left to right from the observer's perspective. The left eye sees the laterally moving object in its present position 42. The right eye sees the object in a position 42' where it was a short period of time earlier. Position 42' is to the right of position 42. The laterally moving object is perceived to be at a location 44 behind its actual location. This produces a visual depth effect. The visual depth effect produced in FIG. 7 is the same as the depth effect produced in FIG. 5. Whereas in FIG. 5 an object moving laterally from right to left is perceived to be in front of its actual location, in FIG. 7 an object moving laterally from left to right is perceived to be in front of its actual location.

FIG. 8 shows the visual depth produced for the third embodiment when the laterally moving object 42 moves from right to left. As in FIG. 7, the plane of polarization of the polarizing projection filter 21 is rotated counterclockwise from horizontal. Now the position 42' where the right eye sees the laterally moving object is to the left of the position 42 where the left eye sees the object. The laterally moving object is perceived to be at a location 43 in front of its actual location. This produces a visual depth effect which is the same as the effect produced in FIG. 5 and opposite to the effect produced in FIGS. 6 and 7.

FIGS. 5 and 8 show for the third embodiment how objects moving laterally from right to left can be made to appear either in front of or behind their actual locations. FIGS. 6 and 7 show for the third embodiment how objects moving laterally from left to right can be made to appear either in front of or behind their actual locations.

Avoiding the Dead Eye Effect

The prior art systems used to produce the standard Pulfrich Effect tend to cause an undesirable side effect. The eye covered by the dark lens receives substantially less light than the other eye. This produces the sensation that the eye receiving less light is not working or dead. This dead eye effect becomes irritating to observers over time. It normally takes several minutes for the dead eye effect to build up. The present invention both provide means to avoid the dead eye effect.

When the plane of polarization of the polarizing projection filter is rotated clockwise from horizontal, the scenery appears brighter to the right eye than to the left eye. This causes the dead eye effect to start to build up in the left eye. Changing the orientation of the plane of polarization of the polarizing projection filter to counterclockwise from horizontal reverses the relative brightness eye to eye brightness of the imagery. Now the scenery appears brighter to the left eye than to the right eye. This breaks down the dead eye effect in the left eye and causes the dead eye effect to start to build up in the right eye. When the polarizing projection filter is oriented approximately horizontal, the scenery appears equally bright to both the left and right eyes. Any dead eye effect which has built up in either eye is reduced or eliminated. By limiting the time that the polarizing projection filter is rotated either clockwise from horizontal or counterclockwise from horizontal, the dead eye effect does not have time to build up in either eye. Thus by periodically changing the orientation of the polarizing projection filter, the dead eye effect can be avoided.

Multiple Polarizing Projection Filters

Figure 9:
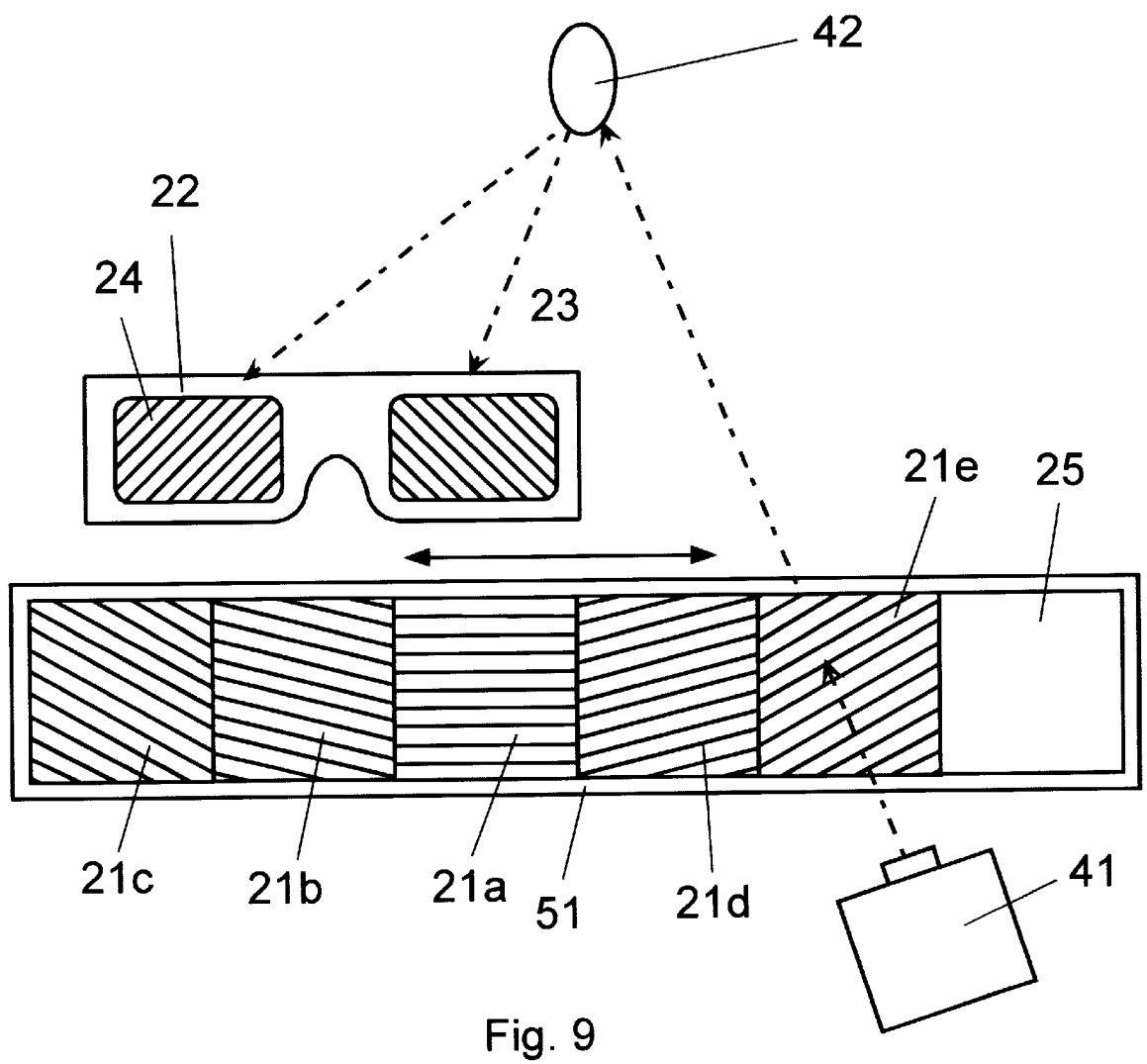
FIG. 9 shows a movable frame holding polarizing projection filters with the planes of polarization at different orientations.

The preferred embodiment as shown in FIGS. 4 through 8 uses a single polarizing projection filter positioned in different angular orientations to provide means to change the orientation of the plane of polarization of the projected light or imagery. Alternate means may be used to change the orientation of the plane of polarization of the projected light or imagery. FIG. 9 shows 5 polarizing projection filters 21a, 21b, 21c, 21d and 21e and a neutral density filter 25 mounted in a movable frame 51. Any of the 5 polarizing filters or the neutral density filter may be positioned in the beam of projected light or imagery. This provides means to change the plane of polarization of the projected light or imagery. Using multiple projection filters allows any one filter to be moved out of the projection beam before it overheats. This reduces the requirement to cool the projection filters. The polarizing filters in FIG. 9 are arranged in a horizontal row. The movable frame is moved horizontally to place different filters in the projection beam. The filters could be arranged in a vertical row, a circle, or some other manner. Electronic means such as arrays of finely spaced parallel LCD's may be used as polarizing projection filters. Multiple layers of LCD's may be used to control the orientation of the plane of polarization of the projected light or imagery.

Controlling the Plane of Polarization of Polarizing Projection Filter

In the first, second and third embodiments of the present invention the plane of polarization of the polarizing projection filter is controlled manually. Means can be provided to automatically control the plane of polarization of the polarizing projection filter. A signal encoded in the sound track of movie film can be used to automatically control the orientation of the polarizing plane of the projection filter. The signal can be encoded in the sound track or in other available space in video tapes and disks. Other means can be provided to control the orientation of the polarizing plane of the projection filter. The neutral orientation of the polarizing projection filter may be horizontal as in the first and second embodiment or in any other orientation.

Recorded Imagery

Recorded imagery such as movie film video tapes, and digital video disc (DVD) may be used to produce lateral motion based visual depth effects. The methodology and apparatus for producing the visual depth effects are based on the above text and figures. Properties of the polarizing projection filters and polarizing viewing filters for viewing the imagery on visual displays are shown in FIGS. 1, 2 and 3. The characteristics of laterally moving objects that can be used in polarized imagery are shown in FIGS. 4 through 8.

Imagery Produced in Real Time

A data processor of known type such as a video game machine or a computer may be used to generate imagery on a visual display in real time to produce lateral motion based visual depth effects. The process for using the data processor and visual display to produce the visual depth effects is based on the above text and figures. Properties of the projection filters and viewing filters for viewing the imagery on the visual display are shown in FIGS. 1, 2 and 3. The characteristics of laterally moving objects that can be used in polarized imagery on the visual display are shown in FIGS. 4 through 8.

Back Lighted Displays

The first and second embodiments of the present invention use projection screens which reflect imagery. Alternate embodiments use back lighted displays in which the imagery is projected through the display screen. The methodology for reflective display screens is directly applicable to back lighted displays. With back lighted displays, as with reflective displays, the plane of polarization of the projected polarized imagery and the plane of polarization of a polarizing viewing filter are aligned to maximize the brightness of the imagery. Offsetting the plane of polarization of the projected polarized imagery from the plane of polarization of a polarizing viewing filter reduces the brightness of the imagery.

Flat Panel Displays

The first and second embodiments of the present invention use projection screens which reflect imagery. Alternate embodiments use flat panel displays in which the imagery is produced on the surface of the display screen. The methodology for reflective display screens is directly applicable to flat panel displays. With flat panel displays, as with reflective displays, the plane of polarization of the projected polarized imagery and the plane of polarization of a polarizing viewing filter are aligned to maximize the brightness of the imagery. Offsetting the plane of polarization of the projected polarized imagery from the plane of polarization of a polarizing viewing filter reduces the brightness of the imagery.

Polarizing Filter Embedded in Movie Films

Figure 10:
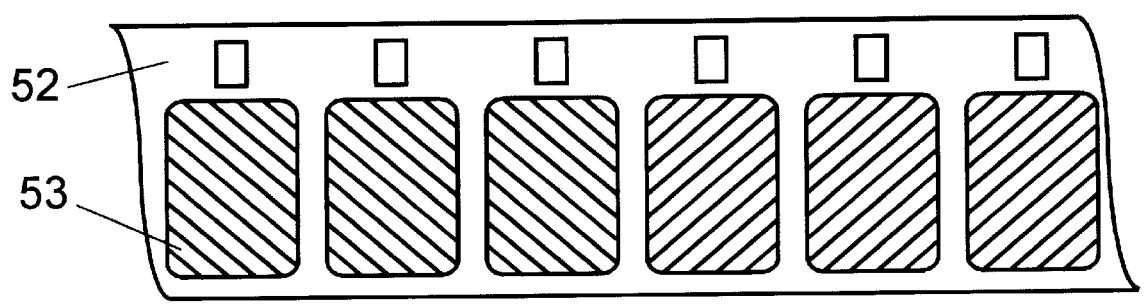
FIG. 10 shows movie film with embedded polarizing projection filters.

FIG. 10 shows an alternative means to control the plane of polarization of the projected beam of imagery for the first and second embodiments. The movie film 52 has polarizing filters 53 embedded in the film. Polarizing filters with different planes of polarization are embedded on different sections of the film. One section of the film is embedded with polarizing filters rotated 45 degrees clockwise from horizontal. The projected light that is transmitted by this section of film is polarized in a plane rotated 45 degrees clockwise from horizontal. This produces the same effect as the projection polarizing filter 21 rotated 45 degrees clockwise from horizontal as shown in FIGS. 5 and 6. Another section of film is embedded with polarizing filters rotated 45 degrees counterclockwise from horizontal. The projected light that is transmitted by this section of film is polarized in a plane rotated 45 degrees counterclockwise from horizontal. This produces the same effect as the projection polarizing filter 21 rotated 45 degrees counterclockwise from horizontal as shown in FIGS. 7 and 8. The polarizing filter embedded in the movie film eliminates the need for an external polarizing filter. This also eliminates the requirement for a means of rotating or moving the polarizing filter. Any standard movie projector may be used with the polarizing movie film 52 to project polarized imagery. This provides means for any standard movie projector to project imagery which when observed with the viewing glasses 22 shown in FIG. 2 creates depth effects for laterally moving objects.

CONCLUSION

The polarizing system for motion depth effects disclosed here can be used to create the perception of visual depth in live scenes and two dimensional single image displays. Objects moving either laterally from right to left or laterally from left to right can be made to appear to be either closer to or farther away from an observer. The depth effects are controlled by the orientation of the polarizing planes of polarizing projection filters and polarizing viewing filters. The scenes can be viewed in full color. The dead eye effect can be avoided by periodically changing the orientation of the projection polarizing filter.

Many variations and alternate embodiments will occur to those skilled in the art. Accordingly, it is intended that the invention be limited only in terms of the appended claims.

I claim:

1. A method of using projected imagery in which some objects in the imagery are moving laterally, which when said imagery is projected through a polarizing projection filter and observed through polarizing viewing glasses, provides visual depth effects, the method comprising:

using viewing glasses comprising a light polarizing means for transmitting light to an observer's left eye and a light polarizing means for transmitting light to the observer's right eye, and the plane of polarization of said light polarizing means for the right eye having an angular offset of 90 degrees from the plane of polarization of said light polarizing means for the left eye;

orienting the plane of polarization of the polarizing projection filter with less angular offset from the plane of polarization of the light transmitting means for the left eye than to the plane of polarization of the light transmitting means for the right eye, and selecting objects which move from left to right from the observer's perspective to create the perception that the objects are closer to the observer, and selecting objects which move from right to left to create the perception that the objects are farther away from the observer; and orienting the plane of polarization of the polarizing projection filter with less angular offset from the plane of polarization of the light transmitting means for the right eye than to the plane of polarization of the light transmitting means for the left eye, and selecting objects which move from left to right from the observer's perspective to create the perception that the objects are farther away from the observer, and selecting objects which move from right to left to create the perception that the objects are closer to the observer.

2. A method of using live scenes in which some objects in the scenes are moving laterally, which when said scenes are illuminated by light projected through a polarizing projection filter and observed through polarizing viewing glasses, provides visual depth effects, the method comprising:

using viewing glasses comprising a light polarizing means for transmitting light to an observer's left eye and a light polarizing means for transmitting light to the observer's right eye, and the plane of polarization of said light polarizing means for the right eye having an angular offset from the plane of polarization of said light polarizing means for the left eye;

orienting the plane of polarization of the polarizing projection filter with less angular offset from the plane of polarization of the light transmitting means for the left eye than to the plane of polarization of the light transmitting means for the right eye, and selecting objects which move from left to right from the observer's perspective to create the perception that the objects are closer to the observer, and selecting objects which move from right to left to create the perception that the objects are farther away from the observer; and orienting the plane of polarization of the polarizing projection filter with less angular offset from the plane of polarization of the light transmitting means for the right eye than to the plane of polarization of the light transmitting means for the left eye, and selecting objects which move from left to right from the observer's perspective to create the perception that the objects are farther away from the observer, and selecting objects which move from right to left to create the perception that the objects are closer to the observer.

3. A process of operating a data processor of known type with a visual display of known type, wherein said data processor generates polarized imagery on said visual display, said polarized imagery provides visual depth effects when the imagery is viewed through viewer glasses comprising a light polarizing means for transmitting light to an observer's left eye and a light polarizing means for transmitting light to the observer's right eye, and the plane of polarization of said light polarizing means for the right eye having an angular offset from the plane of polarization of said light polarizing means for the left eye; said process comprising:

producing polarized imagery on the visual display with the plane of polarization aligned more with the plane of polarization of the light polarizing means for the left eye than the plane of polarization of the light polarizing means for the right eye, comprising laterally moving objects which move from left to right from the observer's perspective to create the perception of being closer to the observer, and which move from right to left to create the perception of being farther from the observer; and producing polarized imagery on the visual display with the plane of polarization aligned more with the plane of polarization of the light polarizing means for the right eye than the plane of polarization of the light polarizing means for the left eye, comprising laterally moving objects which move from right to left from the observer's perspective to create the perception of being closer to the observer, and which move from left to right to create the perception of being farther from the observer.

* * * * *